US012737579B2

(12) United States Patent
Makuta et al.

(10) Patent No.: US 12,737,579 B2
(45) Date of Patent: Sep. 15, 2026

(54) COLOR MANAGEMENT APPARATUS, COLOR MANAGEMENT METHOD, AND PROGRAM

(71) Applicant: FUJIFILM CORPORATION, Tokyo (JP)

(72) Inventors: Toshiyuki Makuta, Kanagawa (JP); Misato Sasada, Kanagawa (JP); Kiyomi Tamagawa, Kanagawa (JP); Takuma Kawamoto, Kanagawa (JP)

(73) Assignee: FUJIFILM CORPORATION, Tokyo (JP)

(*) Notice: Subject to any disclaimer, the term of this patent is extended or adjusted under 35 U.S.C. 154(b) by 266 days.

(21) Appl. No.: 18/434,818

(22) Filed: Feb. 7, 2024

(65) Prior Publication Data

US 2024/0176972 A1 May 30, 2024

Related U.S. Application Data

(63) Continuation of application No. PCT/JP2022/030652, filed on Aug. 10, 2022.

(30) Foreign Application Priority Data

Aug. 13, 2021 (JP) ................................ 2021-132044

(51) Int. Cl.
*G06K 15/02* (2006.01)
*C09D 11/30* (2014.01)
(Continued)

(52) U.S. Cl.
CPC .......... *G06K 15/1878* (2013.01); *C09D 11/30* (2013.01); *G06K 15/102* (2013.01); *H04N 1/6019* (2013.01)

(58) Field of Classification Search
CPC . G06K 15/1878; G06K 15/102; H04N 1/6019
See application file for complete search history.

(56) References Cited

U.S. PATENT DOCUMENTS 6,072,464 A 6/2000 Ozeki
2002/0018863 A1* 2/2002 Ichihashi .............. C09K 19/12 252/299.61

(Continued)

FOREIGN PATENT DOCUMENTS

CN 101022501 A 8/2007
CN 111739109 A 10/2020

(Continued)

OTHER PUBLICATIONS

Extended European Search Report dated Oct. 4, 2024, issued in corresponding EP Patent Application No. 22855908.4.

(Continued)

*Primary Examiner* — Ibrahim Siddo
(74) *Attorney, Agent, or Firm* — SOLARIS Intellectual Property Group, PLLC

(57) ABSTRACT

A color management apparatus includes at least one processor. The processor performs conversion between a first signal value and a first chromaticity value through a color profile. The color profile is created using a second chromaticity value of a color chart formed of at least one ink composition containing a liquid crystal compound and a chiral compound, and a second signal value. Each of the second chromaticity value and the second signal value is associated with amounts of the liquid crystal compound and the chiral compound.

16 Claims, 12 Drawing Sheets

(51) Int. Cl.
*G06K 15/10* (2006.01)
*H04N 1/60* (2006.01)

(56) References Cited

U.S. PATENT DOCUMENTS

| | | | | |
|---|---|---|---|---|
| 2006/0250413 | A1 | 11/2006 | Hoshii | |
| 2007/0188782 | A1 | 8/2007 | Sakurai | |
| 2008/0087192 | A1 | 4/2008 | Starling et al. | |
| 2008/0130023 | A1* | 6/2008 | Perez | H04N 1/6097 358/1.9 |
| 2009/0161187 | A1 | 6/2009 | Hoshii | |
| 2009/0242642 | A1 | 10/2009 | Starling et al. | |
| 2011/0048259 | A1 | 3/2011 | Starling et al. | |
| 2011/0101088 | A1 | 5/2011 | Marguerettaz et al. | |
| 2012/0273722 | A1 | 11/2012 | Marguerettaz et al. | |
| 2018/0285034 | A1* | 10/2018 | Iwamoto | G06F 3/1288 |
| 2021/0008916 | A1 | 1/2021 | Makuta et al. | |

FOREIGN PATENT DOCUMENTS

| | | | |
|---|---|---|---|
| CN | 112004686 | A | 11/2020 |
| EP | 3383018 | A1 | 10/2018 |
| JP | 2005-064727 | A | 3/2005 |
| JP | 2006-020087 | A | 1/2006 |
| JP | 2006-254136 | A | 9/2006 |
| JP | 2008-035567 | A | 2/2008 |
| JP | 2009-10573 | A | 1/2009 |
| JP | 2010-506962 | A | 3/2010 |
| JP | 2010-194722 | A | 9/2010 |
| JP | 2011-524556 | A | 9/2011 |
| JP | 2011-223345 | A | 11/2011 |
| JP | 2012-129905 | A | 7/2012 |
| WO | 2019/188846 | A1 | 10/2019 |

OTHER PUBLICATIONS

International Search Report issued in International Application No. PCT/JP2022/030652 on Sep. 27, 2022.

Written Opinion of the ISA issued in International Application No. PCT/JP2022/030652 on Sep. 27, 2022.

English language translation of the following: Office action dated Nov. 15, 2025 from the SIPO in a Chinese patent application No. 202280055786.X corresponding to the instant patent application. This office action translation is submitted now in order to supplement the understanding of the cited references which are being disclosed in the instant Information Disclosure Statement.

English language translation of the following: Office action dated Mar. 14, 2026 from the SIPO in a Chinese patent application No. 202280055786.X corresponding to the instant patent application.

* cited by examiner

CONVERSION FROM SIGNAL VALUE TO CHROMATICITY VALUE

IMAGE OF PRINTED MATERIAL

MONITOR DISPLAY

IMAGE DATA

COLOR PROFILE

MONITOR PROFILE

CMY SIGNAL VALUE

CHROMATICITY VALUE

RGB SIGNAL VALUE

CORRECTION INSTRUCTION

IMAGE DATA AFTER CORRECTION

CMY SIGNAL VALUE AFTER CORRECTION

INK JET PRINTER

PRINTED MATERIAL

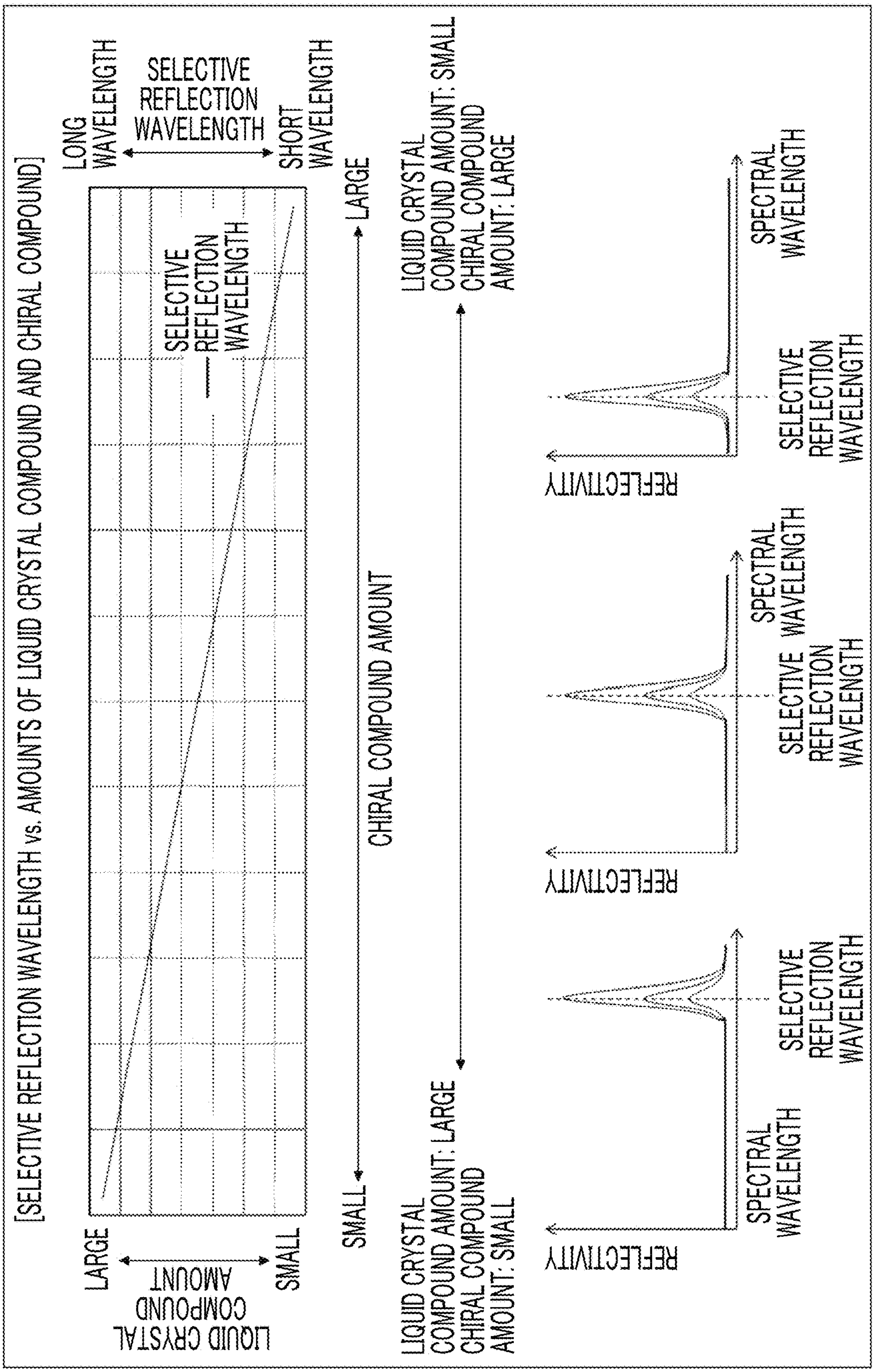

FIG. 4
[SELECTIVE REFLECTION WAVELENGTH vs. AMOUNTS OF LIQUID CRYSTAL COMPOUND AND CHIRAL COMPOUND]
LARGE
LIQUID CRYSTAL COMPOUND AMOUNT
SMALL
LONG WAVELENGTH
SELECTIVE REFLECTION WAVELENGTH
SHORT WAVELENGTH
SELECTIVE REFLECTION WAVELENGTH
SMALL
LARGE
CHIRAL COMPOUND AMOUNT
LIQUID CRYSTAL COMPOUND AMOUNT: LARGE CHIRAL COMPOUND AMOUNT: SMALL
LIQUID CRYSTAL COMPOUND AMOUNT: SMALL CHIRAL COMPOUND AMOUNT: LARGE
REFLECTIVITY
SPECTRAL WAVELENGTH
SELECTIVE REFLECTION WAVELENGTH
REFLECTIVITY
SELECTIVE REFLECTION WAVELENGTH
SPECTRAL WAVELENGTH
REFLECTIVITY
SELECTIVE REFLECTION WAVELENGTH
SPECTRAL WAVELENGTH

FIG. 5

| CMY SIGNAL VALUE | | | CHROMATICITY VALUE (xyY COLOR SYSTEM) | | |
|---|---|---|---|---|---|
| C SIGNAL | M SIGNAL | Y SIGNAL | x | y | Y |
| C1 | M1 | Y1 | x1 | y1 | Y1 |
| C2 | M2 | Y2 | x2 | y2 | Y2 |
| C3 | M3 | Y3 | x3 | y3 | Y3 |
| . | . | . | . | . | . |
| . | . | . | . | . | . |
| . | . | . | . | . | . |
| . | . | . | . | . | . |
| . | . | . | . | . | . |
| . | . | . | . | . | . |

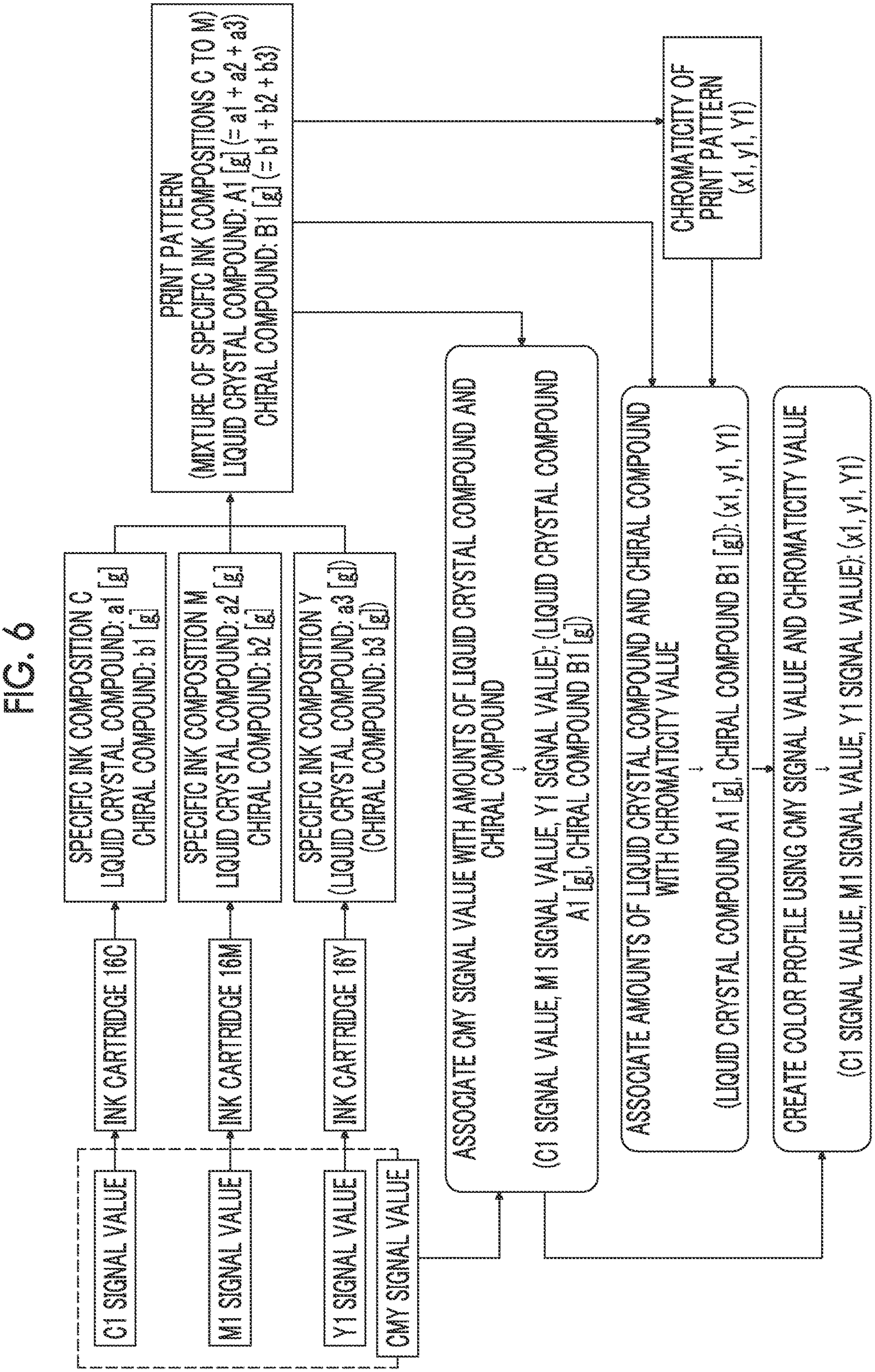

FIG. 6
C1 SIGNAL VALUE
M1 SIGNAL VALUE
Y1 SIGNAL VALUE
CMY SIGNAL VALUE
INK CARTRIDGE 16C
INK CARTRIDGE 16M
INK CARTRIDGE 16Y
SPECIFIC INK COMPOSITION C LIQUID CRYSTAL COMPOUND: a1 [g] CHIRAL COMPOUND: b1 [g]
SPECIFIC INK COMPOSITION M LIQUID CRYSTAL COMPOUND: a2 [g] CHIRAL COMPOUND: b2 [g]
SPECIFIC INK COMPOSITION Y (LIQUID CRYSTAL COMPOUND: a3 [g]) (CHIRAL COMPOUND: b3 [g])
PRINT PATTERN (MIXTURE OF SPECIFIC INK COMPOSITIONS C TO M) LIQUID CRYSTAL COMPOUND: A1 [g] (= a1 + a2 + a3) CHIRAL COMPOUND: B1 [g] (= b1 + b2 + b3)
ASSOCIATE CMY SIGNAL VALUE WITH AMOUNTS OF LIQUID CRYSTAL COMPOUND AND CHIRAL COMPOUND
↓
(C1 SIGNAL VALUE, M1 SIGNAL VALUE, Y1 SIGNAL VALUE): (LIQUID CRYSTAL COMPOUND A1 [g], CHIRAL COMPOUND B1 [g])
ASSOCIATE AMOUNTS OF LIQUID CRYSTAL COMPOUND AND CHIRAL COMPOUND WITH CHROMATICITY VALUE
↓
(LIQUID CRYSTAL COMPOUND A1 [g], CHIRAL COMPOUND B1 [g]): (x1, y1, Y1)
CHROMATICITY OF PRINT PATTERN (x1, y1, Y1)
CREATE COLOR PROFILE USING CMY SIGNAL VALUE AND CHROMATICITY VALUE
↓
(C1 SIGNAL VALUE, M1 SIGNAL VALUE, Y1 SIGNAL VALUE): (x1, y1, Y1)

FIG. 7

| CMY SIGNAL VALUE | | | AMOUNT OF LIQUID CRYSTAL COMPOUND [g] | AMOUNT OF CHIRAL COMPOUND [g] |
|---|---|---|---|---|
| C SIGNAL | M SIGNAL | Y SIGNAL | | |
| C1 | M1 | Y1 | A1 | B1 |
| C2 | M2 | Y2 | A2 | B2 |
| C3 | M3 | Y3 | A3 | B3 |
| . | . | . | . | . |
| . | . | . | . | . |
| . | . | . | . | . |
| . | . | . | . | . |
| . | . | . | . | . |
| . | . | . | . | . |

FIG. 8

| AMOUNT OF LIQUID CRYSTAL COMPOUND [g] | AMOUNT OF CHIRAL COMPOUND [g] | CHROMATICITY VALUE (xyY COLOR SYSTEM) | | |
|---|---|---|---|---|
| | | x | y | Y |
| A1 | B1 | x1 | y1 | Y1 |
| A2 | B2 | x2 | y2 | Y2 |
| A3 | B3 | x3 | y3 | Y3 |
| . | . | . | . | . |
| . | . | . | . | . |
| . | . | . | . | . |
| . | . | . | . | . |
| . | . | . | . | . |
| . | . | . | . | . |

COLOR MANAGEMENT APPARATUS, COLOR MANAGEMENT METHOD, AND PROGRAM

CROSS-REFERENCE TO RELATED APPLICATIONS

This application is a Continuation of International Application No. PCT/JP2022/030652, filed on Aug. 10, 2022, which claims priority to Japanese Patent Application No. 2021-132044, filed on Aug. 13, 2021. The entire contents of these applications are incorporated herein by reference.

BACKGROUND OF THE INVENTION

1. Field of the Invention

The present disclosure relates to a color management apparatus, a color management method, and a program.

2. Description of the Related Art

Color management is widely performed between different devices such as a monitor and an ink jet printer. For example, in a case of obtaining a printed material by printing an image displayed on the monitor with the ink jet printer, the printed material has a color different from the image due to a difference in a color system. By appropriately performing color management, it is possible to obtain a printed material having a desired color. As a part of such color management, for example, conversion between a signal value of the ink jet printer and a chromaticity value is performed through a color profile in JP2005-064727A.

SUMMARY OF THE INVENTION

The technique of the related art including JP2005-064727A relates to color management on the premise that a printed material is obtained using a pigment-based ink, such as cyan, yellow, magenta, and black, a dye-based ink, or the like. On the contrary, an ink composition (hereinafter, called "specific ink composition" in some cases) containing a liquid crystal compound and a chiral compound is different from the inks above in terms of a color development mechanism. In a case where the specific ink composition is used, a new color management apparatus is necessary.

The present disclosure is devised in view of such circumstances. An object to be solved by an embodiment of the present disclosure is to provide a color management apparatus related to an ink composition containing a liquid crystal compound and a chiral compound.

An object to be solved by another embodiment of the present disclosure is to provide a color management method related to the ink composition.

An object to be solved by still another embodiment of the present disclosure is to provide a program for causing a computer to execute a color management process related to the ink composition.

The present disclosure includes the following aspects.

<1> A color management apparatus including at least one processor, in which the processor is configured to:

perform conversion between a first signal value and a first chromaticity value through a color profile, the color profile is created using a second chromaticity value of a color chart formed of at least one ink composition containing a liquid crystal compound and a chiral compound, and a second signal value, and each of the second chromaticity value and the second signal value is associated with amounts of the liquid crystal compound and the chiral compound.

<2> The color management apparatus according to <1>, in which the color profile is created under a condition in which the amounts of the liquid crystal compound and the chiral compound associated with the second chromaticity value and the amounts of the liquid crystal compound and the chiral compound associated with the second signal value are at least partially the same.

<3> The color management apparatus according to <1> or <2>, in which the processor is configured to:

select one from a plurality of selective color profiles as the color profile.

<4> The color management apparatus according to <3>, in which the plurality of selective color profiles include at least two color profiles having color measurement conditions of the second chromaticity value different from each other.

<5> The color management apparatus according to <4>, in which at least one of an incidence angle of color measurement light or a light-receiving angle of reflected light is different between the color measurement conditions.

<6> The color management apparatus according to <4> or <5>, in which a background color of the color chart is different between the color measurement conditions.

<7> The color management apparatus according to any one of <1> to <6>, in which the second chromaticity value includes chromaticity values of color charts formed of at least two ink compositions forming the color charts having maximum reflection wavelengths different from each other.

<8> The color management apparatus according to <7>, in which the color chart has a black background, and the second chromaticity value includes a value measured under a condition in which an incidence angle of color measurement light is 15° and a light-receiving angle of reflected light is 0°, in the color chart formed of one specific ink composition of the at least two specific ink compositions, the maximum reflection wavelength is 430 nm or less, and in the color chart formed of the other specific ink composition of the at least two specific ink compositions, the maximum reflection wavelength is 640 nm or less.

<9> The color management apparatus according to any one of <1> to <8>, in which the second chromaticity value is determined through simulation.

<10> The color management apparatus according to any one of <1> to <9>, in which the color profile defines a color hue circle consisting of the second chromaticity value of the color chart, and the color hue circle does not include an achromatic region.

<11> The color management apparatus according to any one of <1> to <10>, in which the color profile is a look-up table.

<12> The color management apparatus according to any one of <1> to <11>, in which the processor is configured to:

perform conversion from a signal value of image data to a signal value of a device via first conversion which is the conversion between the first signal value and the first chromaticity value.

<13> The color management apparatus according to <12>, in which the device is a monitor, the first signal value is the signal value of the image data, and the processor is configured to:

perform the first conversion which is conversion from the signal value of the image data to the first chromaticity value through the color profile; and perform second conversion which is conversion from the first chromaticity value to an RGB signal value of the monitor through a monitor profile of the monitor.

<14> The color management apparatus according to <12>, in which the device is an ink jet printer, the first signal value is a signal value of the ink jet printer, and the processor is configured to:

perform third conversion which is conversion from the signal value of the image data to the first chromaticity value through another color profile other than the color profile; and perform the first conversion which is conversion from the first chromaticity value to the signal value of the ink jet printer through the color profile.

<15> The color management apparatus according to <14> in which the processor is configured to:

remove an achromatic color component from the image data before performing the third conversion.

<16> A color management method comprising:

performing conversion between a first signal value and a first chromaticity value through a color profile, in which the color profile is created using a second chromaticity value indicating a chromaticity value of a color chart formed of at least one ink composition containing a liquid crystal compound and a chiral compound, and a second signal value, and each of the second chromaticity value and the second signal value is associated with amounts of the liquid crystal compound and the chiral compound.

<17> A program for causing a computer to execute a color management process including:

performing conversion between a first signal value and a first chromaticity value through a color profile, in which the color profile is created using a second chromaticity value of a color chart formed of at least one ink composition containing a liquid crystal compound and a chiral compound, and a second signal value, and each of the second chromaticity value and the second signal value is associated with amounts of the liquid crystal compound and the chiral compound.

According to the embodiment of the present disclosure, the color management apparatus related to the ink composition containing the liquid crystal compound and the chiral compound is provided.

According to another embodiment of the present disclosure, the color management method related to the ink composition is provided.

According to still another embodiment of the present disclosure, the program for causing the computer to execute the color management process related to the ink composition is provided.

BRIEF DESCRIPTION OF THE DRAWINGS

FIG. 4 is a schematic diagram showing an example a relationship between a selective reflection wavelength and amounts of a liquid crystal compound and a chiral compound.

FIG. 5 is a diagram showing an example of a color profile.

FIG. 6 is a schematic diagram showing an example of creation procedures of the color profile.

FIG. 7 is a diagram showing an example of a relationship between a CMY signal value and the amounts of the liquid crystal compound and the chiral compound.

FIG. 8 is a diagram showing an example of a relationship between the amounts of the liquid crystal compound and the chiral compound and an xyY chromaticity value.

DESCRIPTION OF THE PREFERRED EMBODIMENTS

Figure 1:
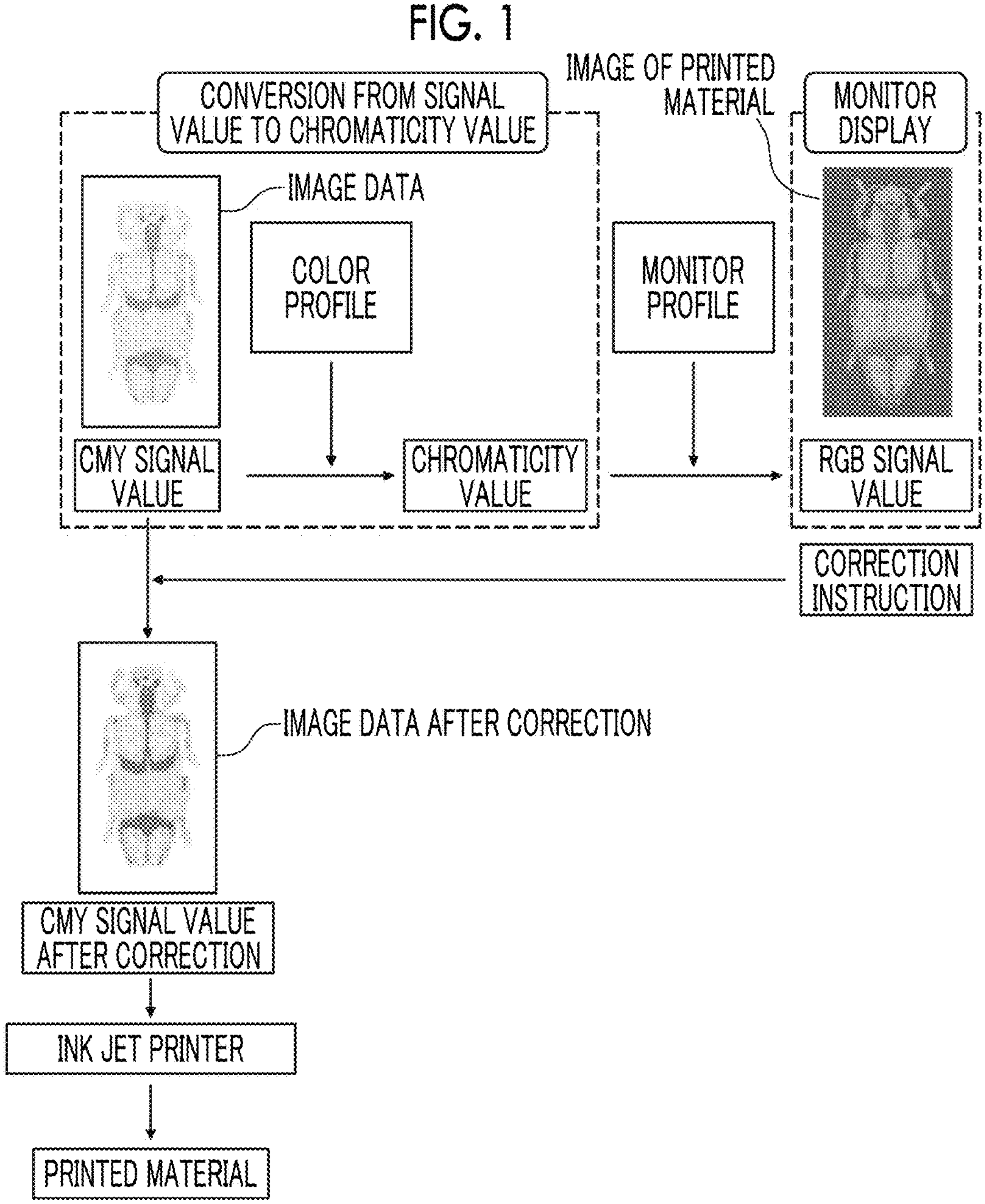
FIG. 1 is a schematic diagram showing an example of conversion from a signal value to a chromaticity value and a flow until a printed material is obtained.

Hereinafter, details of a color management apparatus, a color management method, and a program according to an embodiment of the present disclosure will be described.

In the present disclosure, a CPU is an abbreviation of "central processing unit". An NVM is an abbreviation of "non-volatile memory". A RAM is an abbreviation of "random access memory". An FPGA is an abbreviation of "field-programmable gate array". An SSD is an abbreviation of "solid state drive". An HDD is an abbreviation of "hard disk drive". An EEPROM is an abbreviation of "electrically erasable and programmable read only memory". An EL is an abbreviation of "electro-luminescence". An I/F is an abbreviation of "interface". A DRAM is an abbreviation of "dynamic random access memory". An SRAM is an abbreviation of "static random access memory". A LAN is an abbreviation of "local area network".

The drawings referred to in the following description are exemplarily and schematically shown, and the present disclosure is not limited to the drawings. The same reference numerals indicate the same components. The reference numerals in the drawings are omitted in some cases.

<Color Management Apparatus>

First Embodiment

In a first embodiment, an example of the color management apparatus that converts a CMY signal value of image data into a first chromaticity value (for example, an XYZ value, an xyY value, an L*a*b* value, and the like) will be described. In addition, a process until a printed material having a desired color is obtained will be described. The CMY signal value is an example of a first signal value.

As shown in FIG. 1, in the first embodiment, a CMY signal value of image data is converted into a first chromaticity value through a color profile incorporated in the color management apparatus (not shown). The color profile is created using a second chromaticity value (for example, an XYZ value, an xyY value, an L*a*b* value, and the like) of a color chart formed of at least one specific ink composition, which is a second chromaticity value associated with amounts (for example, a mass, a volume, and the like) of a liquid crystal compound and a chiral compound, and a second signal value (for example, a CMY signal value) associated with the amounts of the liquid crystal compound and the chiral compound. In the color profile, the signal value is correlated with the chromaticity value.

Measurement of a color of the color chart is performed with a print pattern formed on a transparent substrate placed on a measurement table. For this reason, the color of the color chart is determined by overlapping of the color of the print pattern and the color of the measurement table. For example, in a case where the measurement table is black and a case where the measurement table is white, the color of the color chart is different even in a state where the color of a print pattern portion is the same.

Hereinafter, a part overlapping the color chart of the measurement table is referred to as a “background”.

An obtained first chromaticity value is converted into an RGB signal value through a monitor profile, and an image is displayed on a monitor using the RGB signal value. The image displayed on the monitor is a reproduction of an image of a printed material created using a specific ink composition in a case where a CMY signal value of image data is output to an ink jet printer. The image displayed on the monitor shown in FIG. 1 is an example of display in a case where the background is black. A black portion of the image displayed on the monitor of FIG. 1 indicates a black background.

A user checks an image of a printed material displayed on the monitor and corrects a CMY signal value such that a desired color of the printed material is obtained. Then, a printed material having a desired color is created by outputting a CMY signal value after correction to the ink jet printer. In another aspect, in a case where the user has determined that the image of the printed material displayed on the monitor has the desired color, the CMY signal value may be output to the ink jet printer without correcting the CMY signal value.

Hereinafter, the color management apparatus of the first embodiment will be described in further detail.

Figure 2:
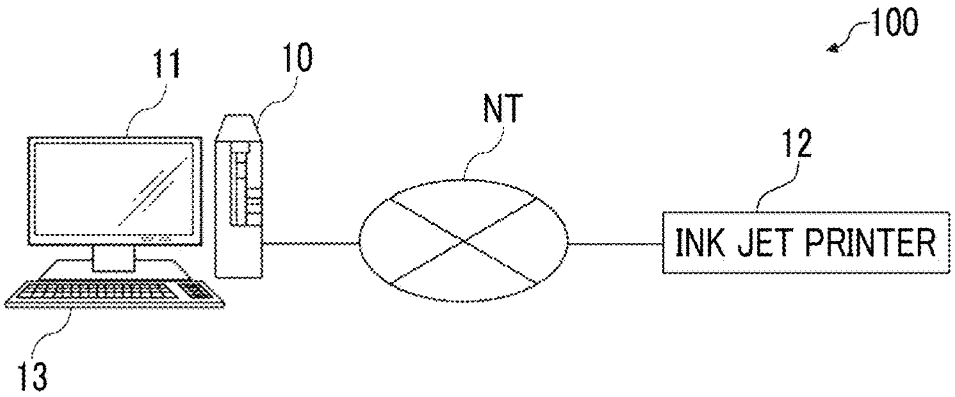
FIG. 2 is a schematic configuration diagram showing an example of a color management system including a color management apparatus.

As shown in FIG. 2, a color management apparatus 10 is connected to a monitor 11, an ink jet printer 12, and a reception device 13. As described above, the color management apparatus 10 is connected to the devices to configure a color management system 100.

The color management apparatus 10 incorporates a computer 40 (sec FIG. 3) and controls the entire color management system 100.

The reception device 13 receives various types of instructions from the user who uses the color management apparatus 10. Examples of the reception device 13 include a keyboard, a mouse, and a touch panel. The color management apparatus 10 grasps various types of instructions received by the reception device 13. The monitor 11 displays various types of information (for example, an image, a text, and the like) under the control of the color management apparatus 10. Examples of the monitor 11 include a liquid crystal display or an EL display.

The ink jet printer 12 is communicably connected to the color management apparatus 10 via a communication network NT (for example, the Internet, a LAN, and the like) and operates under the control of the color management apparatus 10. A connection method for the color management apparatus 10 and the ink jet printer 12 may be a wired connection method or may be a wireless connection method.

Figure 3:
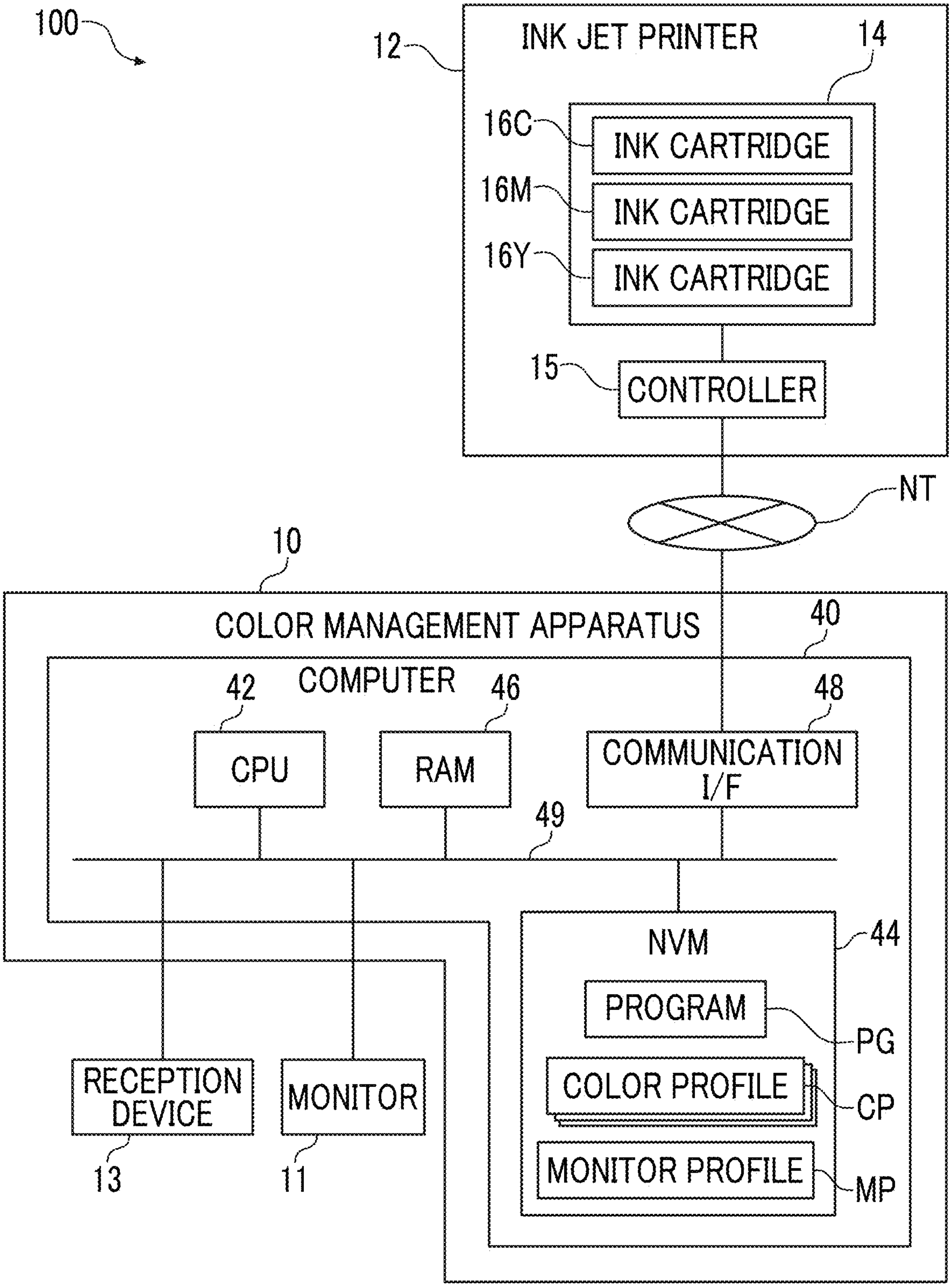
FIG. 3 is a block diagram showing an example of hardware configurations of the color management apparatus and an ink jet printer.

As shown in FIG. 3, the computer 40 has a CPU 42, an NVM 44, a RAM 46, and a communication I/F 48. The CPU 42 is an example of a “processor” according to the embodiment of the present disclosure.

The CPU 42, the NVM 44, the RAM 46, and the communication I/F 48 are connected to a bus 49. In the example shown in FIG. 3, for convenience of illustration, one bus is shown as the bus 49, but a plurality of buses may be used. The bus 49 may be a serial bus or may be a parallel bus. The parallel bus includes a data bus, an address bus, a control bus, and the like.

The NVM 44 stores various types of data. Examples of the NVM 44 include various types of non-volatile storage devices, such as an EEPROM, an SSD, and an HDD. The RAM 46 temporarily stores various types of information and is used as a work memory. Examples of the RAM 46 include a DRAM and an SRAM.

A program PG is stored in the NVM 44. The CPU 42 reads out a necessary program from the NVM 44 and executes the read out program PG on the RAM 46. The CPU 42 controls the entire color management system 100 including the color management apparatus 10 by executing the process according to the program PG.

The communication I/F 48 is an interface realized by a hardware resource, such as an FPGA. The communication I/F 48 is communicably connected to a controller 15 of the ink jet printer 12 via the communication network NT and exchanges various types of information between the CPU 42 and the controller 15.

The reception device 13 and the monitor 11 are also connected to the bus 49, and the CPU 42 operates according to an instruction from the user received by the reception device 13 and displays various types of information on the monitor 11.

A color profile CP for performing conversion between a first signal value (a CMY signal in the first embodiment) and a first chromaticity value is stored in the NVM 44. The color profile CP is created using a second chromaticity value of a color chart formed of at least one ink composition (that is, a specific ink composition) containing a liquid crystal compound and a chiral compound, and a second signal value associated with amounts of the liquid crystal compound and the chiral compound. Each of the second chromaticity value and the second signal value is associated with the amounts of the liquid crystal compound and the chiral compound contained in the specific ink composition used in order to obtain the second chromaticity value. By using the color profile CP, the color management apparatus 10 can output the color of a print pattern formed of the specific ink composition to the monitor 11 in response to an input of a certain first signal value. In the example shown in FIG. 3, the first signal value is a CMY signal value. A monitor profile MP of the monitor 11 is stored in the NVM 44. In the color profile CP, the first signal value can be converted into the first chromaticity value, and the first chromaticity value can be converted into the first signal value.

A specific ink composition contains a liquid crystal compound and a chiral compound. A print pattern having a selective reflection wavelength according to a ratio between the liquid crystal compound and the chiral compound can be formed using the specific ink composition. The print pattern has color development derived from reflected light having the selective reflection wavelength and has a predetermined chromaticity value. The selective reflection wavelength is approximately 380 nm (violet to blue) to 830 nm (red). Two or more types of specific ink compositions capable of forming patterns having selective reflection wavelength different from each other may be used, two types thereof are preferably used, and three types thereof are more preferably used.

The term “ratio between the liquid crystal compound and the chiral compound” indicates a proportion of a total amount of the liquid crystal compound and the chiral compound with respect to a total amount of ink (hereinafter, an “addition proportion”), a proportion of the amount of the liquid crystal compound with respect to the total amount of the liquid crystal compound and the chiral compound (hereinafter, also referred to as a “proportion of the liquid crystal compound”), and a proportion of the amount of the chiral compound with respect to the total amount of the liquid crystal compound and the chiral compound. The amount is, for example, a mass, a volume, and the like. In a case where the amount is a mass, the addition proportion indicates a total mass of the liquid crystal compound and the chiral compound with respect to a total mass of ink. In a case where the amount is a mass, the term “ratio between the liquid crystal compound and the chiral compound” indicates a proportion of the chiral compound (% by mass) or a proportion of the liquid crystal compound (% by mass).

The term “selective reflection wavelength” refers to an average value of the above two wavelengths as a wavelength that indicates half-value transmittance: T ½(%) represented by the following formula, in a case where a wavelength is obtained with a minimum value (maximum value of reflectivity) of transmittance in a target object (for example, a print pattern, a background, and the like) as Tmin (%).

$$T½=100-[(100-T\min)]\div 2$$ Formula for acquiring half-value transmittance:

As shown in FIG. 4, by changing a ratio between a liquid crystal compound and a chiral compound, a helical pitch of the liquid crystal compound can be changed. In general, a selective reflection wavelength increases in a case where a proportion of the liquid crystal compound is large and decreases in a case where the proportion of the liquid crystal compound is small. For this reason, the selective reflection wavelength is changed according to the ratio between the liquid crystal compound and the chiral compound, and a print pattern having various chromaticity values can be obtained. As described above, the specific ink composition can show various types of color development by changing the ratio between the liquid crystal compound and the chiral compound, without performing overcoating. For this reason, in a case of using the specific ink composition, it is preferable that the print pattern is one layer.

As described above, since a print pattern formed of a specific ink composition has color development derived from reflected light having a selective reflection wavelength, the print pattern does not show color development of an achromatic region (black, gray, white, and the like).

Composing of a specific ink composition is not particularly limited insofar as a liquid crystal compound and a chiral compound are contained. From a perspective of fixing of a color of the print pattern, improvement of high water resistance, and the like, the liquid crystal compound is preferably polymerizable. Examples of the specific ink composition include specific ink compositions described in WO2019/188846A (paragraphs 0020 to 0072) and WO2021/059879A (paragraphs 0016 to 0077). An ink jet method can be suitably used as a printing method.

The ink jet printer 12 comprises an ink discharge device 14 and the controller 15. The ink discharge device 14 has an ink cartridge 16C corresponding to a C signal, an ink cartridge 16M corresponding to an M signal, and an ink cartridge 16Y corresponding to a Y signal. A specific ink composition C, a specific ink composition M, and a specific ink composition Y having amounts of a liquid crystal compound and a chiral compound different from each other are accommodated in the ink cartridge 16C, the ink cartridge 16M, and the ink cartridge 16Y, respectively.

Colors of print patterns formed of the specific ink compositions accommodated in the ink cartridge 16C, the ink cartridge 16M, and the ink cartridge 16Y may be different from cyan (C), magenta (M), and yellow (Y), respectively. Description of CMY is used for convenience to represent the specific ink compositions accommodated in the ink cartridges corresponding to the C signal, the M signal, and the Y signal, respectively.

The controller 15 controls the ink cartridge 16C, the ink cartridge 16M, and the ink cartridge 16Y under the control of the color management apparatus 10 to discharge the specific ink composition C, the specific ink composition M, and the specific ink composition Y. In this case, the specific ink composition C, the specific ink composition M, and the specific ink composition Y are discharged by amounts corresponding to CMY signal values, and the discharged specific ink compositions are mixed. That is, a liquid crystal compound and a chiral compound are discharged by amounts corresponding to the CMY signal values, and the discharged liquid crystal compound and the discharged chiral compound are mixed, forming a print pattern. The print pattern has a chromaticity value associated with the amounts of the liquid crystal compound and the chiral compound. In this manner, the print pattern formed by mixing the liquid crystal compound and the chiral compound by the amounts corresponding to the CMY signal values can be obtained, and various chromaticity values can be expressed.

As shown in FIG. 5, the color profile CP includes CMY signal values and a chromaticity value of a print pattern formed in a case where the signal values are input into the ink jet printer 12. Such a color profile CP is created, for example, as follows. In FIGS. 5 to 8, the CMY signal values are an example of a second signal value, and the chromaticity value (xyY color system) is an example of a second chromaticity value.

First, as shown in FIG. 6, a relationship between CMY signal values and amounts of the specific ink composition C, the specific ink composition M, and the specific ink composition Y that are discharged from the ink cartridge 16C, the ink cartridge 16M, and the ink cartridge 16Y, respectively, is grasped. The specific ink composition C is discharged from the ink cartridge 16C according to a C1 signal value. The discharged specific ink composition C contains a1 [g] of a liquid crystal compound and b1 [g] of a chiral compound. The specific ink composition M is discharged from the ink cartridge 16M according to an M1 signal value. The discharged specific ink composition M contains a2 [g] of the liquid crystal compound and b2 [g] of the chiral compound. The specific ink composition Y is discharged from the ink cartridge 16Y according to a Y1 signal value. The discharged specific ink composition Y contains a3 [g] of the liquid crystal compound and b3 [g] of the chiral compound. Then, from the amounts of the liquid crystal compound and the chiral compound, the amount of the liquid crystal compound (A1 [g]=a1+a2+a3) and the amount of the chiral compound (B1 [g]=b1+b2+b3) in the print pattern formed by mixing the specific ink composition C to the specific ink composition Y are learned. From the above, the CMY signal values and the amounts of the liquid crystal compound and the chiral compound can be associated with each other. That is, the C1 signal value, the M1 signal value, and the Y1 signal value can be associated with the liquid crystal compound amount, which is A1 [g], and the chiral compound amount, which is B1 [g].

Further, as shown in FIG. 6, a relationship between amounts of a liquid crystal compound and a chiral compound and a chromaticity value of a formed print pattern is grasped. The color of the print pattern formed as described above (a color chart formed of a specific ink composition containing A1 [g] of the liquid crystal compound and B1 [g] of the chiral compound) is measured. Accordingly, for example, a chromaticity value (x1, y1, Y1) in the xyY color system of the print pattern can be obtained. From the above, the amounts of the liquid crystal compound and the chiral compound and the chromaticity value can be associated with each other. That is, the liquid crystal compound amount, which is A1 [g], and the chiral compound amount, which is B1 [g], can be associated with the chromaticity value (x1, y1, Y1) in the xyY color system.

As described above, a chromaticity value of a color chart (print pattern), which is a chromaticity value associated with amounts of a liquid crystal compound and a chiral compound, and CMY signal values associated with the amounts of the liquid crystal compound and the chiral compound can be obtained. In addition, the CMY signal values and the chromaticity value can be connected with each other via the amounts of the liquid crystal compound and the chiral compound. That is, a color profile can be created using the CMY signal values (a C1 signal value, an M1 signal value, a Y1 signal value) and the chromaticity value (x1, y1, Y1).

As shown in FIG. 7, in a case of creating a color profile, CMY signal values are changed, and amounts of a liquid crystal compound and a chiral compound corresponding to each CMY signal value are acquired. As shown in FIG. 8, the amounts of the liquid crystal compound and the chiral compound are changed, and a chromaticity value corresponding to each amount is acquired. Accordingly, a color chart corresponding to a variety of CMY signal values and chromaticity values can be created.

A method of connecting CMY signal values and a chromaticity value with each other via amounts of a liquid crystal compound and a chiral compound is not particularly limited.

For example, a relationship between the amounts of the liquid crystal compound, and the chiral compound and the chromaticity value is converted into a function by fitting with a polynomial or the like, and the relationship between the amounts of the liquid crystal compound, and the chiral compound and each CMY signal value is converted into a function by fitting with a polynomial or the like. Accordingly, the CMY signal values and the chromaticity value may be connected with each other via the amounts of the liquid crystal compound and the chiral compound.

From a perspective of improving conversion accuracy of a color profile, it is preferable that a chromaticity value of a color chart (print pattern) with respect to amounts of a certain liquid crystal compound and a certain chiral compound and a signal value for discharging the amounts of the liquid crystal compound and the chiral compound are at least partially in a one-to-one correspondence relationship. That is, it is preferable that the color profile is created under a condition in which the amounts of the liquid crystal compound and the chiral compound associated with the chromaticity value and the amounts of the liquid crystal compound and the chiral compound associated with the signal value are at least partially the same. Accordingly, for example, compared to a case where a relationship between the amounts described above and the chromaticity value is converted into a function, the accuracy of associating the chromaticity value with the signal value can be improved, and a color profile with higher conversion accuracy can be obtained. From a perspective of further improving the conversion accuracy of the color profile, it is preferable that there are a larger number of portions where the amounts of the liquid crystal compound and the chiral compound associated with the chromaticity value and the amounts of the liquid crystal compound and the chiral compound associated with the signal value are the same, and it is most preferable that all are the same.

For example, in FIGS. 7 and 8, amounts of a liquid crystal compound and a chiral compound are the same, and since a relationship between CMY signal values and a chromaticity value is known via the amounts, the color profile CP shown in FIG. 5 can be obtained. The color profile CP obtained in this manner is created using a chromaticity value of a color chart formed of at least one specific ink composition containing a liquid crystal compound and a chiral compound, which is a chromaticity value associated with amounts of the liquid crystal compound and the chiral compound, and a signal value associated with the amounts of the liquid crystal compound and the chiral compound.

Although an aspect of creation of a color profile has been described hereinbefore, a color profile creating method is not limited to the method above, and a color profile can be created through various methods. For example, a variety of color profiles can be created by selection of a color system of a chromaticity value of a color chart, a maximum reflection wavelength and the number of specific ink compositions, color measurement conditions of a color chart, and the like. Further, a color profile can also be created by simulating a chromaticity value of a color chart.

A color system of a chromaticity value of a color chart is not particularly limited, a variety of color systems (for example, an RGB color system, an XYZ color system, the xyY color system, the L*a*b* color system, and the like) determined by a spectral wavelength and lightness are given as an example thereof.

In the present disclosure, the term "chromaticity value" is a concept including lightness and chroma saturation. For example, a chromaticity value in the xyY color system is (x, y, Y), and a chromaticity value in the L*a*b* color system is (L*, a*, b*).

A second chromaticity value used in creating of a color profile may include a chromaticity value of a color chart formed of at least two specific ink compositions forming color charts having maximum reflection wavelengths different from each other. The color profile shown in FIG. 5 is created using three specific ink compositions having amounts of a liquid crystal compound and a chiral compound different from each other.

The term "maximum reflection wavelength" indicates a wavelength at which reflectivity is maximum in a case where a reflection spectrum is measured in a range of 400 to 800 nm using an integrating sphere with an ultraviolet-visible-near infrared spectrophotometer V770 (JASCO Corporation).

As described above, various color profiles can be created by changing color measurement conditions of a color chart.

For example, a print pattern formed of a specific ink composition has color appearance that varies depending on an angle at which the print pattern is observed. That is, the color appearance of the print pattern has angular dependence. For this reason, in a case of measuring a chromaticity value of a print pattern using color measurement light, different color profiles including information of angular dependence can be created by changing at least one of an incidence angle of color measurement light or a light-receiving angle of reflected light.

A print pattern formed of a specific ink composition has color appearance that varies depending on a background color (that is, a color of a printed body). That is, the color appearance of the print pattern has background dependence. For this reason, in a case of measuring a chromaticity value of the print pattern using color measurement light, different color profiles having information of the background color can be created by changing the background color of the print pattern.

In a case where a second chromaticity value includes a chromaticity value of a color chart formed of at least two ink compositions forming color charts having maximum reflection wavelengths different from each other, for example, the color chart may have a black background, and the chromaticity value may include a chromaticity value measured under a condition in which an incidence angle of color measurement light is 15° and a light-receiving angle of reflected light is 0°, in a color chart formed of one specific ink composition of at least two specific ink compositions, a maximum reflection wavelength may be 430 nm or less, and in a color chart formed of the other specific ink composition of at least two specific ink compositions, a maximum reflection wavelength may be 640 nm or more.

It is possible to express obtained various colors by mixing two types of specific ink compositions having a large difference in the maximum reflection wavelength as described above. That is, in a wide range from a maximum reflection wavelength which is 430 nm or less to a maximum reflection wavelength which is 640 nm or more, it is possible to obtain a print pattern having a desired maximum reflection wavelength. A printed material having a desired color (black background) can be obtained by adjusting the chromaticity value (an incidence angle of color measurement light of 15° and a light-receiving angle of reflected light of 0°) in such a wide wavelength range.

A second chromaticity value of a color chart may be determined through simulation.

For example, a plurality of color charts (that is, print patterns) are prepared by changing amounts of a liquid crystal compound and a chiral compound, and optical spectra of color charts are acquired. Then, a chromaticity value in a desired color system is calculated by superposing optical spectra at any proportion (corresponding to mixing of specific ink compositions). Accordingly, for a print pattern created using a specific ink composition containing a liquid crystal compound and a chiral compound at a ratio not actually measured, a chromaticity value can be simulated.

For example, it is possible to simulate angular dependence of the chromaticity value using an optical model, and it is also possible to simulate a chromaticity value in a case of changing a background color.

A color profile can be created using a second chromaticity value of a color chart acquired through simulation as described above.

A print pattern formed of a specific ink composition does not show color development of an achromatic region as described above. For this reason, a color hue circle excluding a chromaticity value of the achromatic region may be defined. That is, a color profile defines a color hue circle consisting of a chromaticity value of a color chart, and the color hue circle may not include the achromatic region. Accordingly, for example, a color profile having characteristics such that color development strengthens toward a high chroma saturation region without color development of the achromatic region can be created.

A color profile may be a look-up table.

In the example shown in FIG. 3, a plurality of selective color profiles CP are stored in the NVM 44. The plurality of selective color profiles CP include at least two color profiles having color measurement conditions of a second chromaticity value different from each other. Specifically, the selective color profiles CP include the color profile CP in which at least one of an incidence angle of color measurement light or a light-receiving angle of reflected light is different under color measurement conditions and the color profile CP in which a background color of a color chart is different.

Figure 9:
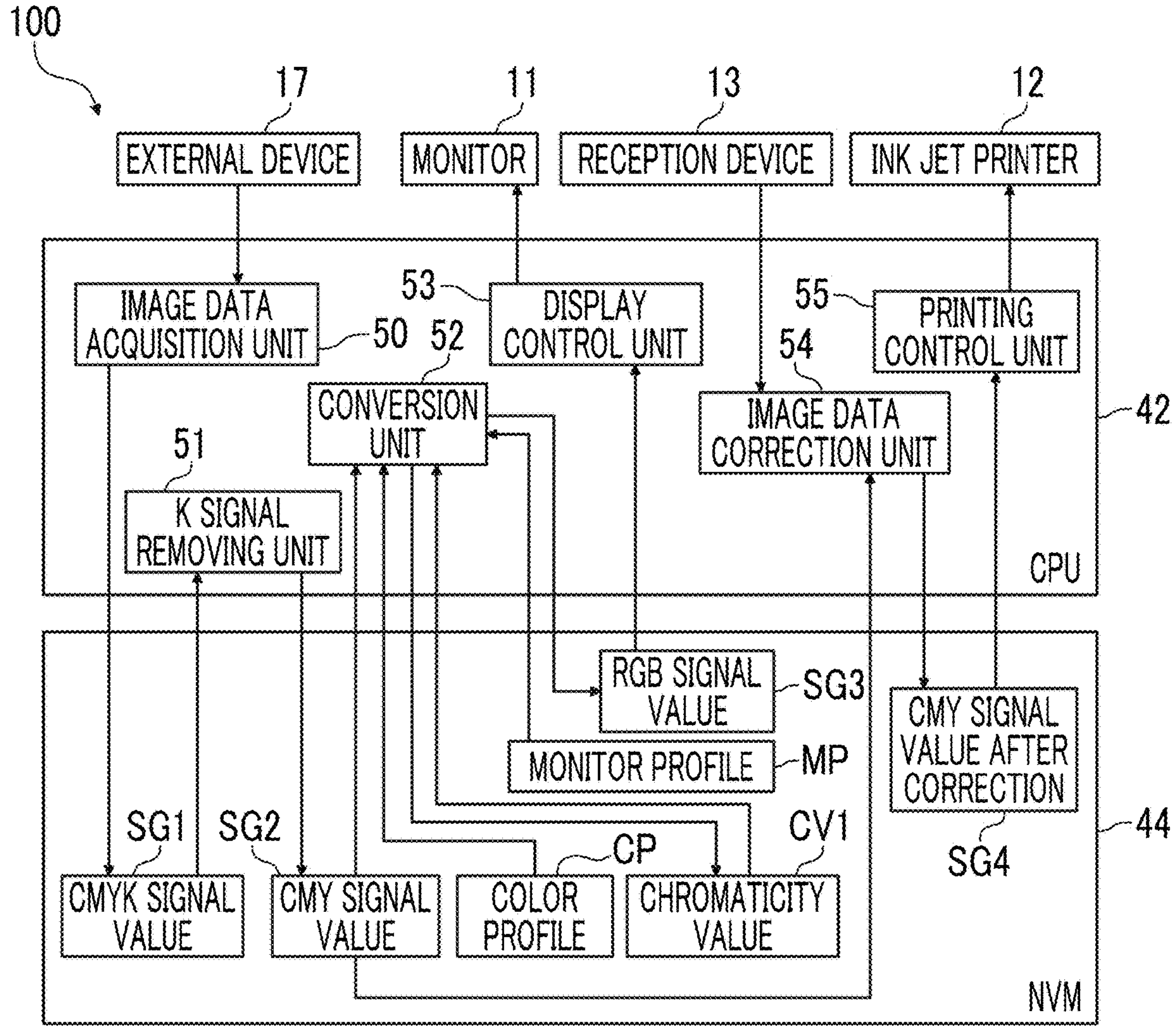
FIG. 9 is a block diagram showing an example of a function of a CPU included in the color management apparatus.

As shown in FIG. 9, a plurality of functional units are realized as the CPU 42 executes an operation based on the program PG. The program PG causes the CPU 42 to function as an image data acquisition unit 50, a K signal removing unit 51, a conversion unit 52, a display control unit 53, an image data correction unit 54, and a printing control unit 55.

The image data acquisition unit 50 acquires image data from an external device 17 (for example, an imaging apparatus, an external storage device storing an image, and the like). The image data is a CMYK signal value SG1, and the image data acquisition unit 50 stores the CMYK signal value SG1 in the NVM 44. In another aspect, the image data may be an RGB signal value. The image data may be image data of an image created by drawing software.

The K signal removing unit 51 removes a K signal value from the CMYK signal value SG1 and outputs a CMY signal value SG2 to be stored in the NVM 44. In another aspect, in a case where image data is an RGB signal value, the K signal removing unit may replace an R signal value, a G signal value, and a B signal value of RGB signal values with a C signal value, an M signal value, and a Y signal value, respectively and output a CMY signal value.

The conversion unit 52 performs conversion (that is, first conversion) from the CMY signal value SG2 to a chromaticity value CV1, which is a first chromaticity value, through the color profile CP and stores the chromaticity value CV1 in the NVM 44.

The conversion unit 52 performs conversion (that is, second conversion) from the chromaticity value CV1 to an RGB signal value SG3 through the monitor profile MP and stores the RGB signal value SG3 in the NVM 44.

The display control unit 53 performs control of outputting the RGB signal value SG3 to the monitor 11 and displaying an image of a printed material obtained in a case where an image is printed using the specific ink composition C, the specific ink composition M, and the specific ink composition Y on the monitor 11.

The color profile CP and the monitor profile MP may configure a device link profile. Conversion from the CMY signal value SG2 to an RGB signal value may be performed through the device link profile.

The user checks an image of a printed material displayed on the monitor 11. As described above, the plurality of selective color profiles CP (at least two color profiles having color measurement conditions of a chromaticity value different from each other) are stored in the NVM 44. As necessary, the user checks a change of a color of an image of a printed material, which is caused by a difference in a viewing angle, a background color, or the like, by selecting any color profile CP different from a color profile in which the first conversion has been performed from the plurality of selective color profiles CP (that is, changing the color profile CP). By changing the color profile CP, the CMY signal value SG2 is converted into a chromaticity value different from the chromaticity value CV1 obtained in the first conversion. Consequently, the color of the image of the printed material displayed on the monitor 11 is changed.

The user identifies a portion to be subjected to correction of a color in an image of a printed material and inputs a color correction instruction (that is, an instruction for changing a color of the identified portion) into the reception device 13. The reception device 13 outputs a correction instruction of a CMY signal value SG2 to the image data correction unit 54.

The image data correction unit 54 corrects the CMY signal value SG2 according to an input correction instruction and outputs a CMY signal value after correction SG4 to be stored in the NVM 44. The CMY signal value after correction SG4 is displayed as an image of a printed material on the monitor 11 via conversion through the color profile CP and the monitor profile MP, as described above for the CMY signal value SG2 before correction.

For example, the image data correction unit 54 identifies a signal value of a pixel of a portion to be subjected to correction of a color in the image of the printed material and corrects the CMY signal value SG2 by changing the CMY signal value SG2 corresponding to the signal value of the pixel in response to a correction instruction.

The printing control unit 55 outputs the CMY signal value after correction SG4 to the ink jet printer 12.

The controller 15 of the ink jet printer 12 controls the ink cartridge 16C, the ink cartridge 16M, and the ink cartridge 16Y and discharges the specific ink composition C, the specific ink composition M, and the specific ink composition Y. Accordingly, a printed material having a desired color can be obtained.

In the first embodiment, conversion from the CMY signal value SG2 to an RGB signal value is performed using two profiles including the color profile CP and the monitor profile MP. Such conversion is, for example, conversion of CMY signal value→xyY chromaticity value→RGB signal value.

In another aspect, conversion from a CMY signal value to an RGB signal value may be performed by combining three or more profiles. For example, conversion of CMY signal value→L*a*b* chromaticity value→xyY chromaticity value→RGB signal value can be performed by combining three or more profiles. That is, conversion from a CMY signal value to an L*a* chromaticity value can be performed through a first color profile, conversion from an L*a*b* chromaticity value to an xyY chromaticity value can be performed through a second color profile, and conversion from an xyY chromaticity value to an RGB signal value can be performed through a third color profile.

Second Embodiment

An example of the color management apparatus that converts a chromaticity value into a CMY signal value will be described in a second embodiment. In addition, a process until a printed material is obtained will also be described.

Figure 10:
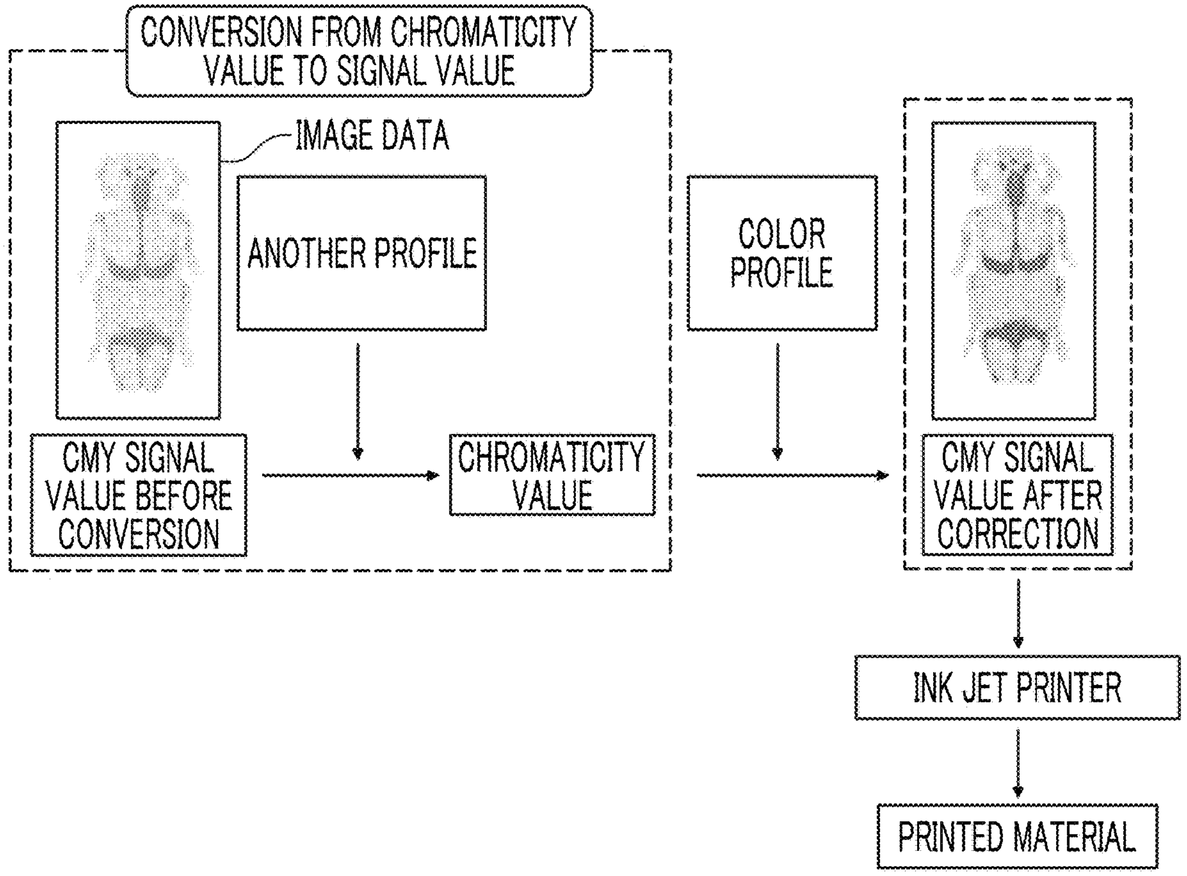
FIG. 10 is a schematic diagram showing an example of conversion from a chromaticity value to a signal value and a flow until a printed material is obtained.

As shown in FIG. 10, in the second embodiment, a CMY signal value before conversion of image data is converted into a first chromaticity value through a profile ("another profile" in FIG. 10) different from the color profile according to the first embodiment. The obtained first chromaticity value is converted into a CMY signal value through a color profile incorporated in the color management apparatus (not shown). Then, a printed material is created by outputting the obtained CMY signal value after conversion to the ink jet printer. The CMY signal value after conversion is an example of a first signal value.

Hereinafter, the color management apparatus of the second embodiment will be described in further detail.

Hereinafter, as an example in which a process by the CPU is different from the first embodiment, the second embodiment will be described with reference to FIG. 11. A configuration of a color management system 100A of the second embodiment is the same as in FIGS. 2 and 3 showing the configuration of the color management system 100 of the first embodiment. The monitor 11 and the reception device 13 are omitted in FIG. 11.

Figure 11:
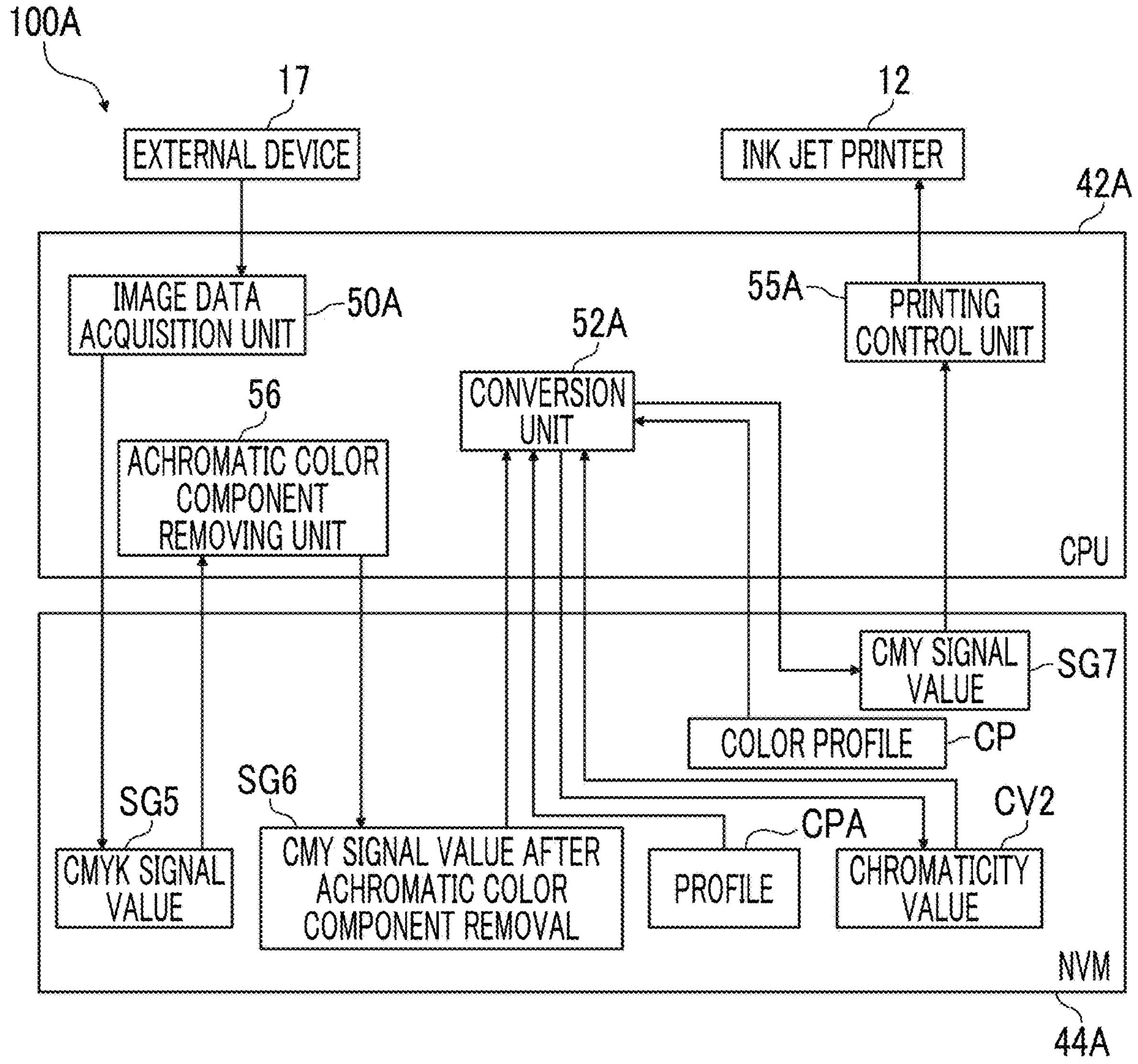
FIG. 11 is a block diagram showing an example of a function of a CPU included in a color management apparatus.

As shown in FIG. 11, a plurality of functional units are realized as a CPU 42A executes an operation based on the program PG. The program PG causes the CPU 42A to function as an image data acquisition unit 50A, an achromatic color component removing unit 56, a conversion unit 52A, and a printing control unit 55A. The image data acquisition unit 50A and the printing control unit 55A are the same as the image data acquisition unit 50 and the printing control unit 55 described in the first embodiment.

The achromatic color component removing unit 56 removes a signal value of an achromatic color component from a CMYK signal value SG5 before performing conversion (that is, first conversion) through the color profile CP and outputs a CMY signal value after achromatic color component removal SG6 to be stored in an NVM 44A. In another aspect, in a case where image data is an RGB signal value, the achromatic color component removing unit replaces an R signal value, a G signal value, and a B signal value of RGB signal values with a C signal value, an M signal value, and a Y signal value, respectively, removes a signal value of an achromatic color component, and outputs a CMY signal value after achromatic color component removal.

The conversion unit 52A performs conversion from the CMY signal value after achromatic color component removal SG6 (CMY signal value before conversion) to a chromaticity value CV2 that is a first chromaticity value through a profile CPA which is a color profile different from the color profile CP according to the first embodiment (that is, third conversion) and stores the chromaticity value CV2 in the NVM 44A. The profile CPA is an example of another color profile.

Further, the conversion unit 52A performs conversion from the chromaticity value CV2 to a CMY signal value SG7 (CMY signal value after conversion) through the color profile CP according to the first embodiment (that is, first conversion) and stores the CMY signal value SG7 in the NVM 44A. In this aspect, the color profile CP functions as a printer profile. The CMY signal value SG7 is an example of a first signal value.

The color profile CP and the profile CPA may configure a device link profile. Conversion from the CMY signal value after achromatic color component removal SG6 to the CMY signal value SG7 may be performed through the device link profile.

The printing control unit 55A outputs the CMY signal value SG7 to the ink jet printer 12. Accordingly, a printed material is obtained.

In the second embodiment, conversion from the CMYK signal value SG5 to the CMY signal value SG7 is performed using two profiles including the color profile CP according to the first embodiment and the profile CPA. Such conversion is, for example, conversion of CMY signal value→xyY chromaticity value→CMY signal value via conversion to a chromaticity value.

In another aspect, conversion from a CMY signal value to a CMY signal value may be performed via conversion to a chromaticity value by combining three or more profiles. For example, conversion of CMY signal value→L*a*b* chromaticity value→xyY chromaticity value→CMY signal value can be performed by combining three or more profiles. That is, conversion from a CMY signal value to an L*a*b* chromaticity value can be performed through a first color profile, conversion from an L*a*b* chromaticity value to an xyY chromaticity value can be performed through a second color profile, and conversion from an xyY chromaticity value to a CMY signal value can be performed through a third color profile.

Modification Example

In a modification example, an example of a process of directly converting a signal value of an image data into a signal value after correction of performing color correction will be described.

Figure 12:
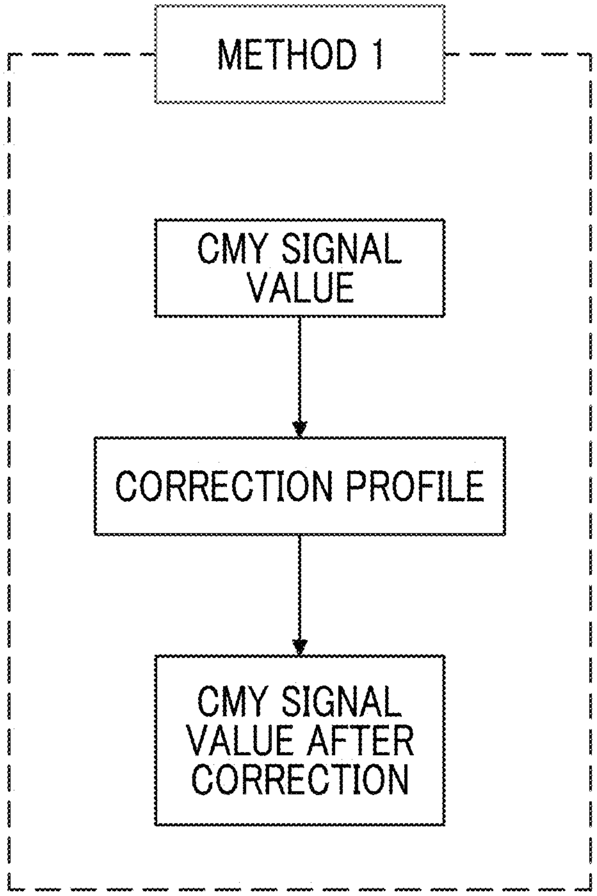
FIG. 12 is a diagram showing an example of a CMY signal value obtained through a correction profile.
Figure 13:
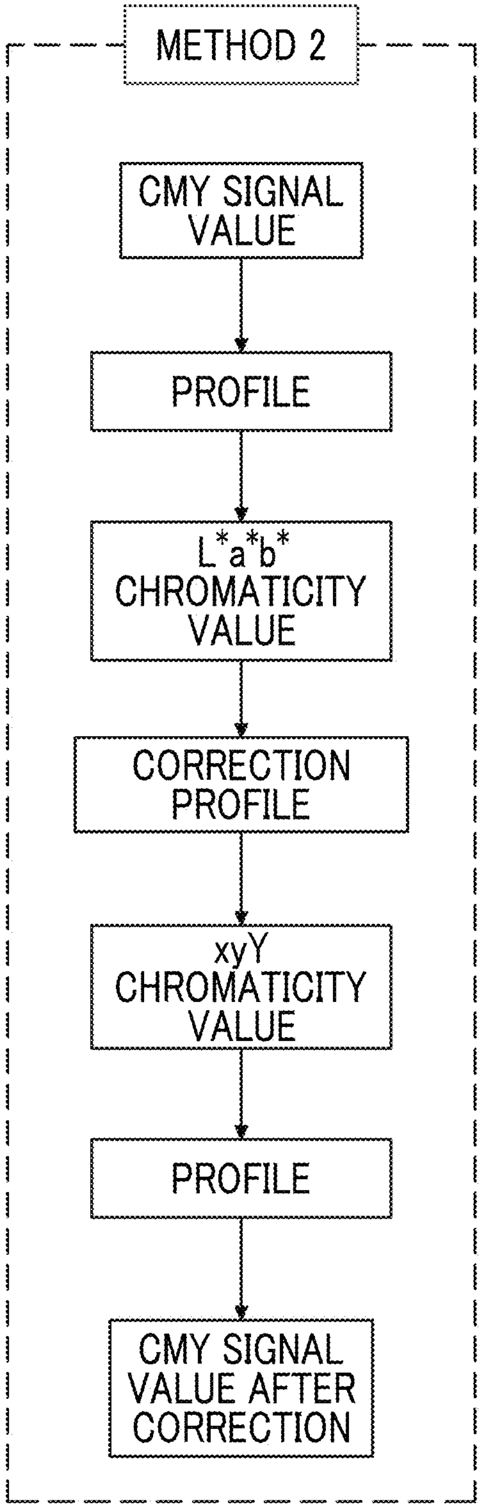
FIG. 13 is a diagram showing an example of the CMY signal value obtained through the correction profile.
Figure 14:
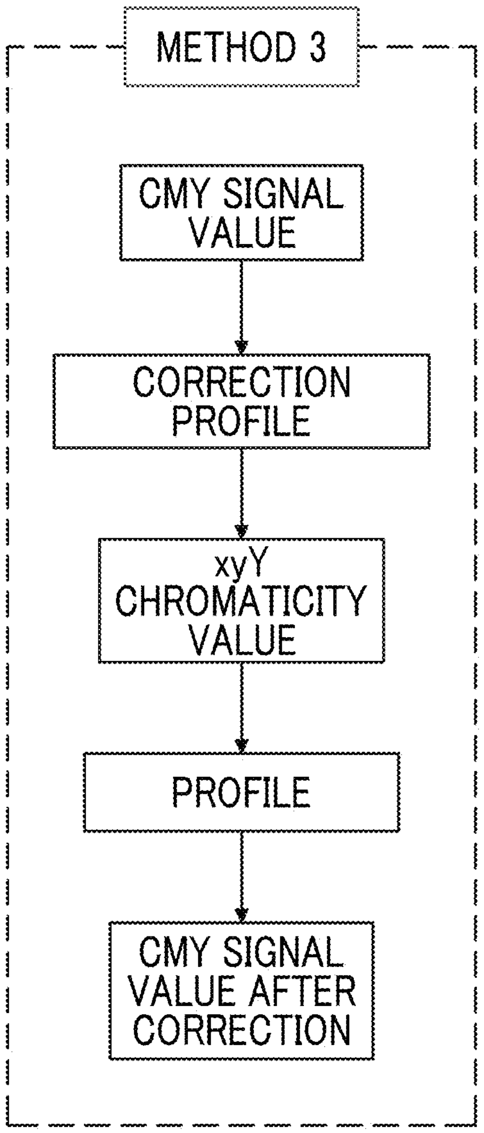
FIG. 14 is a diagram showing an example of the CMY signal value obtained through the correction profile.

As shown in FIGS. 12 to 14, an aspect in which a CMY signal value of image data is converted into a CMY signal value after correction is given as an example. Further details will be described below.

In the first embodiment, as described above, the image data correction unit 54 corrects the CMY signal value SG2 according to a correction instruction by the user and outputs the CMY signal value after correction SG4. That is, conversion from the CMY signal value SG2 to the CMY signal value SG4 is performed according to the correction instruction by the user. For example, a correction profile obtained by profiling a history of the correction instruction by the user (hereinafter, simply called a "correction profile" in some cases) is created, and direct conversion from the CMY signal value SG2 to the CMY signal value after correction SG4 can be performed through the correction profile. In a certain aspect, it is also possible to create a correction profile for direct conversion from the CMYK signal value SG1 to the CMY signal value after correction SG4.

For example, as described above, the image data correction unit 54 identifies a signal value of a pixel of a portion to be subjected to correction of a color in an image of a printed material and corrects the CMY signal value SG2 by changing the CMY signal value SG2 corresponding to the signal value of the pixel in response to a correction instruction. Such correction is patterned. That is, in a case where there is a portion showing a specific color in the image of the printed material, a correction profile, in which the extent to which the CMY signal value SG2 corresponding to the signal value of the pixel of the portion is corrected is patterned, is created. Conversion from the CMY signal value SG2 to the CMY signal value after correction SG4 can be performed through such a correction profile. Conversion from the CMYK signal value SG1 to the CMY signal value after correction SG4 can be performed by incorporating a table for removing a K signal value in the correction profile.

The conversion described hereinbefore is method 1 that is an example of conversion from a CMY signal value (may be a CMYK signal value in a certain aspect, and the same applies thereafter) to a CMY signal value after correction, as shown in FIG. 12.

In another aspect, as in method 2 shown in FIG. 13, conversion from a L*a*b* chromaticity value to an xyY chromaticity value may be performed through a correction profile. In this case, conversion from a CMY signal value to an L*a*b* chromaticity value is performed through any profile, conversion from an L*a*b* chromaticity value to an xyY chromaticity value is performed through the correction profile, and conversion from an xyY chromaticity value to a CMY signal value after correction is performed through any profile. Through such a series of flows, conversion from a CMY signal value to a CMY signal value after correction is performed.

In another aspect, as in method 3 shown in FIG. 14, conversion from a CMY signal value to an xyY chromaticity value may be performed through a correction profile. In this case, conversion from a CMY signal value to an xyY chromaticity value is performed through a correction profile, and conversion from an xyY chromaticity value to a CMY signal value after correction is performed through any profile. Through such a series of flows, conversion from a CMY signal value to a CMY signal value after correction is performed.

Color management may be performed by the color management apparatus according to the embodiment of the present disclosure using a color profile according to the embodiment of the present disclosure as "any profile" above.

Although the first embodiment, the second embodiment, and the modification example have been described hereinbefore as examples of using a CMY signal value, the present disclosure is not limited to a case of using the CMY signal value.

In a certain aspect, in addition to the CMY signal value, one or more signal values other than the CMY signal value may also be used. In another aspect, only one or two signal values of a C signal value, an M signal value, and a Y signal value may be used.

<Color Management Method>

The color management method according to the embodiment of the present disclosure includes performing conversion between a first signal value and a first chromaticity value through a color profile created using a second chromaticity value of a color chart formed of at least one ink composition containing a liquid crystal compound and a chiral compound, which is a second chromaticity value associated with amounts of the liquid crystal compound and the chiral compound, and a second signal value associated with the amounts of the liquid crystal compound and the chiral compound.

Each configuration of the color management method is derived from the configuration described above in the color management apparatus.

<Program>

The program according to the embodiment of the present disclosure, the program causing a computer to execute a color management process including:

performing conversion between a first signal value and a first chromaticity value through a color profile created using a second chromaticity value of a color chart formed of at least one ink composition containing a liquid crystal compound and a chiral compound, which is a second chromaticity value associated with amounts of the liquid crystal compound and the chiral compound, and a second signal value associated with the amounts of the liquid crystal compound and the chiral compound.

Each configuration of the program is derived from the configuration described above in the color management apparatus.

The content of the above description and the content of the drawings are detailed description of portions according to the disclosed technology and are merely examples of the disclosed technology. For example, description related to the above configurations, functions, actions, and effects is description related to an example of configurations, functions, actions, and effects of the portions according to the disclosed technology. Thus, it is needless to say that unnecessary portions may be deleted, new elements may be added, or replacement may be made to the content of the above description and the content of the drawings without departing from the gist of the disclosed technology. In order to avoid confusion and to facilitate understanding of the portions according to the disclosed technology, description related to common technical knowledge or the like that does not require particular description to enable implementation of the disclosed technology is omitted from the content of the above description and the content of the drawings.

All publications, patent applications, and technical standards described in the present specification are incorporated herein by reference to the same extent as in a case where each publication, each patent application, and each technical standard are specifically and individually indicated to be incorporated by reference.

EXPLANATION OF REFERENCES

10: color management apparatus
11: monitor
12: ink jet printer
13: reception device
14: ink discharge device
15: controller
16C, 16M, 16Y: ink cartridge
40: computer
42, 42A: CPU
44, 44A: NVM
46: RAM
48: communication I/F
49: bus
50, 50A: image data acquisition unit
51: K signal removing unit
52, 52A: conversion unit
53: display control unit
54: image data correction unit
55, 55A: printing control unit
56: achromatic color component removing unit
100, 100A: color management system
NT: communication network
PG: program
CP: color profile
CPA: profile
MP: monitor profile
SG1: CMYK signal value
SG2: CMY signal value
SG3: RGB signal value
SG4: CMY signal value after correction
SG5: CMYK signal value
SG6: CMY signal value after achromatic color component removal
SG7: CMY signal value
CV1, CV2: chromaticity value The entire disclosure of Japanese Patent Application No. 2021-132044, filed Aug. 13, 2021, is incorporated into the present specification by reference.

What is claimed is:

1. A color management apparatus comprising at least one processor, wherein the processor is configured to:

perform conversion between a first signal value and a first chromaticity value through a color profile, the color profile is created using a second chromaticity value of a color chart formed of at least one ink composition containing a liquid crystal compound and a chiral compound, and a second signal value, and each of the second chromaticity value and the second signal value is associated with amounts of the liquid crystal compound and the chiral compound, wherein the second chromaticity value includes chromaticity values of color charts formed of at least two ink compositions forming the color charts having maximum reflection wavelengths different from each other, wherein the color chart has a black background, and the second chromaticity value includes a value measured under a condition in which an incidence angle of color measurement light is 15° and a light-receiving angle of reflected light is 0°, in the color chart formed of one specific ink composition of the at least two specific ink compositions, the maximum reflection wavelength is 430 nm or less, and in the color chart formed of the other specific ink composition of the at least two specific ink compositions, the maximum reflection wavelength is 640 nm or less.

2. The color management apparatus according to claim 1, wherein the color profile is created under a condition in which the amounts of the liquid crystal compound and the chiral compound associated with the second chromaticity value and the amounts of the liquid crystal compound and the chiral compound associated with the second signal value are at least partially the same.

3. The color management apparatus according to claim 1, wherein the processor is configured to:

select one from a plurality of selective color profiles as the color profile.

4. The color management apparatus according to claim 3, wherein the plurality of selective color profiles include at least two color profiles having color measurement conditions of the second chromaticity value different from each other.

5. The color management apparatus according to claim 4, wherein at least one of an incidence angle of color measurement light or a light-receiving angle of reflected light is different between the color measurement conditions.

6. The color management apparatus according to claim 4, wherein a background color of the color chart is different between the color measurement conditions.

7. The color management apparatus according to claim 1, wherein the second chromaticity value is determined through simulation.

8. The color management apparatus according to claim 1, wherein the color profile defines a color hue circle consisting of the second chromaticity value of the color chart, and the color hue circle does not include an achromatic region.

9. The color management apparatus according to claim 1, wherein the color profile is a look-up table.

10. The color management apparatus according to claim 1, wherein the processor is configured to:

perform conversion from a signal value of image data to a signal value of a device via first conversion which is the conversion between the first signal value and the first chromaticity value.

11. The color management apparatus according to claim 10, wherein the device is a monitor, the first signal value is the signal value of the image data, and the processor is configured to:

perform the first conversion which is conversion from the signal value of the image data to the first chromaticity value through the color profile; and perform second conversion which is conversion from the first chromaticity value to an RGB signal value of the monitor through a monitor profile of the monitor.

12. The color management apparatus according to claim 10, wherein the device is an ink jet printer, the first signal value is a signal value of the ink jet printer, and the processor is configured to:

perform third conversion which is conversion from the signal value of the image data to the first chromaticity value through another color profile other than the color profile; and perform the first conversion which is conversion from the first chromaticity value to the signal value of the ink jet printer through the color profile.

13. The color management apparatus according to claim 12, wherein the processor is configured to:

remove an achromatic color component from the image data before performing the third conversion.

14. The color management apparatus according to claim 1, wherein the processor is configured to:

perform conversion from a signal value of image data to a signal value of a device via first conversion which is the conversion between the first signal value and the first chromaticity value, wherein the device is an ink jet printer, wherein the first chromaticity value is a CMY signal value or a CMYK signal value, and wherein the processor is configured to:

perform third conversion which is conversion from the signal value of the image data to the first chromaticity value through another color profile other than the color profile; and perform the first conversion which is conversion from the first chromaticity value to the signal value of the ink jet printer through the color profile.

15. A color management method comprising:

performing conversion between a first signal value and a first chromaticity value through a color profile, wherein the color profile is created using a second chromaticity value indicating a chromaticity value of a color chart formed of at least one ink composition containing a liquid crystal compound and a chiral compound, and a second signal value, and each of the second chromaticity value and the second signal value is associated with amounts of the liquid crystal compound and the chiral compound, wherein the second chromaticity value includes chromaticity values of color charts formed of at least two ink compositions forming the color charts having maximum reflection wavelengths different from each other, wherein the color chart has a black background, and the second chromaticity value includes a value measured under a condition in which an incidence angle of color measurement light is 15° and a light-receiving angle of reflected light is 0°, in the color chart formed of one specific ink composition of the at least two specific ink compositions, the maximum reflection wavelength is 430 nm or less, and in the color chart formed of the other specific ink composition of the at least two specific ink compositions, the maximum reflection wavelength is 640 nm or less.

16. A color management method comprising:

performing conversion between a first signal value and a first chromaticity value through a color profile, wherein the color profile is created using a second chromaticity value of a color chart formed of at least one ink composition containing a liquid crystal compound and a chiral compound, and a second signal value, and each of the second chromaticity value and the second signal value is associated with amounts of the liquid crystal compound and the chiral compound, wherein the second chromaticity value includes chromaticity values of color charts formed of at least two ink compositions forming the color charts having maximum reflection wavelengths different from each other, wherein the color chart has a black background, and the second chromaticity value includes a value measured under a condition in which an incidence angle of color measurement light is 15° and a light-receiving angle of reflected light is 0°, in the color chart formed of one specific ink composition of the at least two specific ink compositions, the maximum reflection wavelength is 430 nm or less, and in the color chart formed of the other specific ink composition of the at least two specific ink compositions, the maximum reflection wavelength is 640 nm or less.

* * * * *